Sept. 15, 1931.  G. J. CREIGHTON  1,822,884
HEATER FOR AUTOMOTIVE SHIELDS
Filed Feb. 19, 1929   2 Sheets-Sheet 1
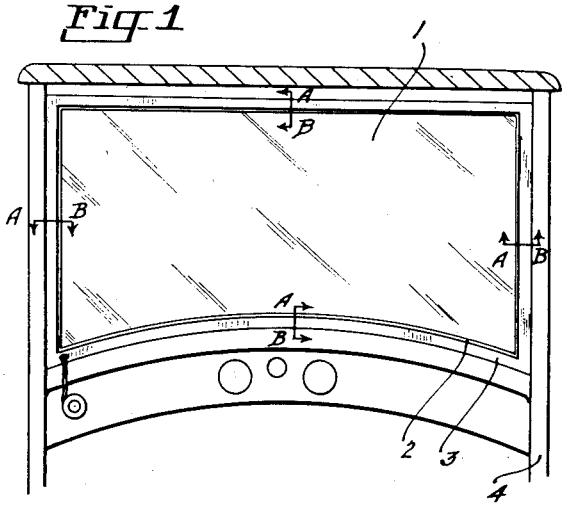
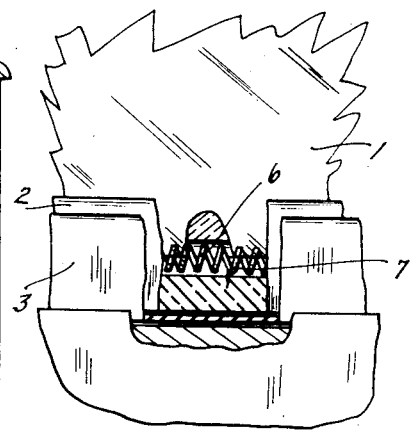
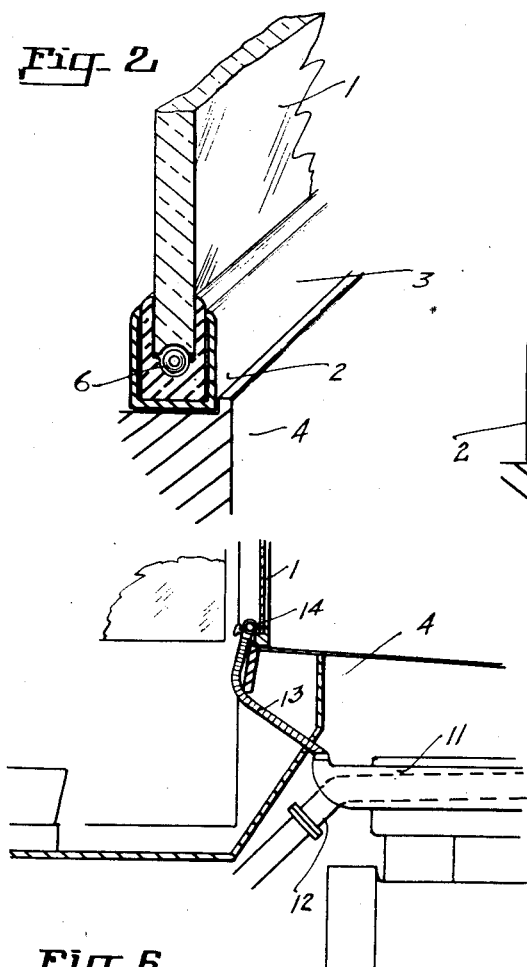
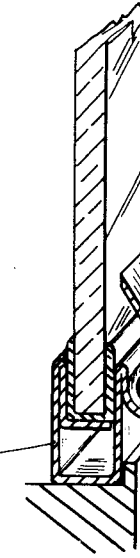
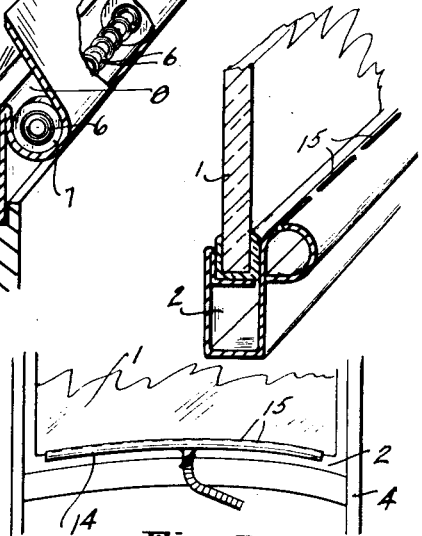
George J. Creighton
INVENTOR
ATTORNEY Sept. 15, 1931. G. J. CREIGHTON 1,822,884
HEATER FOR AUTOMOTIVE SHIELDS
Filed Feb. 19, 1929 2 Sheets-Sheet 2
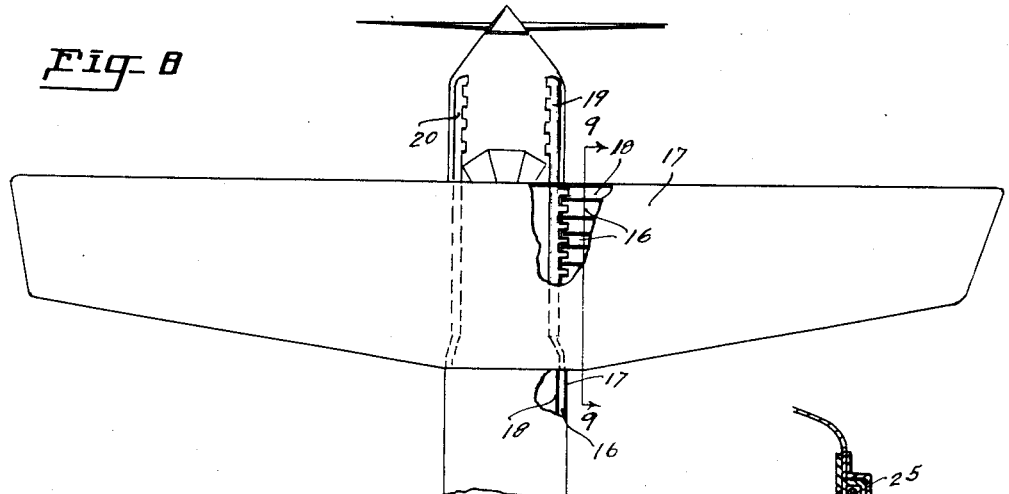
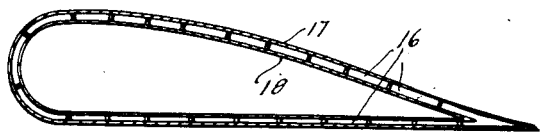
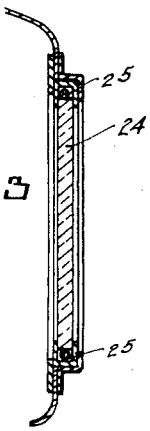
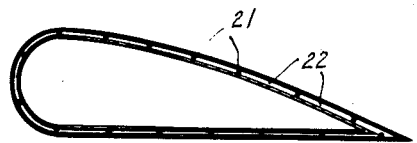
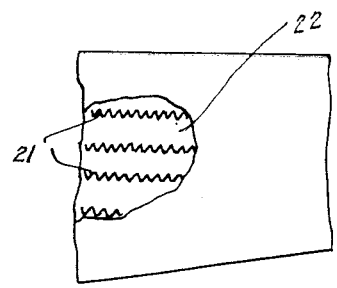
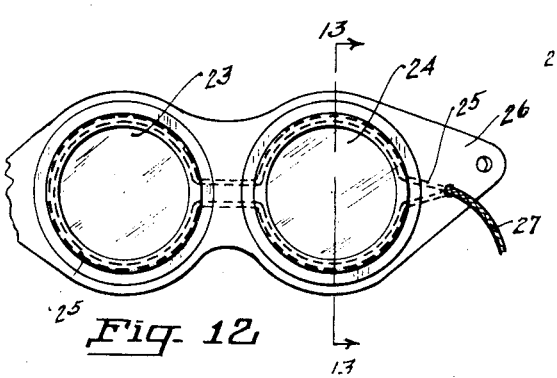
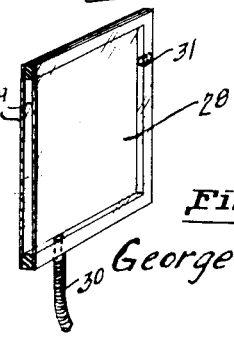
George J. Creighton
INVENTOR
BY
Thomas Bilyeu
ATTORNEY Patented Sept. 15, 1931

1,822,884

UNITED STATES PATENT OFFICE

GEORGE J. CREIGHTON, OF PORTLAND. OREGON

HEATER FOR AUTOMOTIVE SHIELDS

Application filed February 19, 1929. Serial No. 341,188.

The primary purpose and object of my invention is for the maintaining of the look out protecting glass or shield in a warmed condition to prevent the gathering of snow, ice and frost particles upon the exterior of the same when being driven or worn in inclement low temperature weather and to prevent the forming of dew or vapor upon the inside of the glass.

A further object of my invention consists in maintaining the look out glass in a warmed condition by a heating element running circumferentially or adjacent the outer edge of the look out glass.

A further object of my invention resides in new, novel and useful means of utilizing the heat from the exhaust of a motor vehicle for maintaining the look out glass in a warmed condition.

The invention consists primarily of a look out glass, as a windshield, or as the goggle glasses of motor cycle riders, the same being enclosed within a proper shield, providing and having means disposed the edges of the same for releasing or applying heat to the glass.

I preferably apply such heat to the interior of the shield in order that the total heat released on the shield may not be dissipated exteriorly of the vehicle.

With these and incidental objects in view, the invention consists in certain novel features of construction and combination of parts, the essential elements of which are set forth in the appended claims and a preferred form of embodiment of which is hereinafter shown with reference to the drawings which accompany and form a part of this specification.

In the drawings:

Fig. 1 is a front view of an inner shield commonly used upon motor vehicles.

Fig. 2 is a fragmentary, perspective, sectional view of a portion of the look out glass, illustrating the same supported within the frame, the same being taken on line 2—2 of Fig. 1, looking in the direction indicated.

Fig. 3 is a fragmentary, sectional, front view of a portion of the shield of the look out, illustrating a preferred form for the application of heat to the look out glass.

Fig. 4 is a perspective, sectional, end view of a modified form for the application of the heat to the shield.

Fig. 5 is a perspective, sectional, end view of still a further modified form for the application of heat to the look out glass supported within the frame.

Fig. 6 is a fragmentary, sectional, side view, illustrating a construction adapted for the utilization of the heat taken from the exhaust manifold of a motor vehicle.

Fig. 7 is a fragmentary, front view, illustrating means for the delivery of the heat taken from the exhaust manifold and delivering the same adjacent the lower edge of the look out glass.

Fig. 8 is a fragmentary, partially in section, plan view of an aeroplane, utilizing the heat of the exhaust from the internal combustion motor for warming the sections of the aeroplane to prevent the gathering of frost, ice and snow particles upon the surface during flight.

Fig. 9 is a sectional, end view of one of the wing structures, and same being taken on line 9—9 of Fig. 8, looking in the direction indicated.

Fig. 10 is a fragmentary, partially sectional, top, plan view of a wing structure, utilizing electric heating elements for warming the same.

Fig. 11 is a sectional, end view taken on line 11—11 of Fig. 10, looking in the direction indicated.

Fig. 12 is a partial front view of a pair of goggles having an electric heating element disposed circumferentially of each of the eye glasses, or lens, disposed within the goggle frame.

Fig. 13 is a sectional view, taken on line 13—13 of Fig. 12, looking in the direction indicated.

Fig. 14 is a fragmentary, sectional, perspective, end view of a double walled look out glass having means for admitting warmed air in the space disposed between the two transparent elements.

Like reference characters refer to like parts throughout the several views.

Where my device is to be used for the protecting of look out glasses, as automobile wind shields, as the glass wind shield disposed in locomotive cabs, or upon the bridge of ships, the same may be made as illustrated in Figs. 1, 2, 3, 4, 5, 6 and 7 wherein the glass or transparent member 1 is enclosed within a suitable frame 2. The frame 2 being further protected by a shield 3 that is directly attachable to the body frame structure of the vehicle into which the look out glass is to be placed.

I have found that it is not necessary to heat the look out glass to any high degree of temperature to accomplish the result, better results being obtained if the same is maintained in a warm condition. This can be successfully accomplished by running circumferentially of the glass an electric heating element consisting primarily of a suitable heating element 6, the same being maintained and disposed within proper insulating rings 7. The rings being sufficiently large to prevent a shortage or grounding of the heating element relative to the frame structure. A particular advantage is formed in Figs. 1, 2 and 3. Equally satisfactory results may be obtained from the construction illustrated in Fig. 4, wherein a pocket 8 is disposed adjacent the inner, lower edge of the glass 1. The electric conductor is disposed within the pocket 5, and is maintained in spaced relationship with the jacket 9, by the insulating elements 7. The upper edge 10 of the closure being in spaced relationship with the glass, creates a draft passageway through which the warm air upwardly passes and is discharged in intimate contact with the shield or look out glass 1.

When it is found desirable to warm the glass from the exhaust gases of the motor vehicle, a stove 11 is placed about the exhaust manifold 12, and the heated air passes upwardly through the flexible conductor 13 and is delivered into a passageway 14, disposed adjacent the lower, inner surface of the look out glass. Discharge slots 15 are disposed in the upper surface of the passageway 14, that permits the discharge of the warmed air in close contact with the lower surface of the look out glass. This not only warms the look out glass, but the warmed air released within the vehicle closure may be economically utilized for the warming of the vehicle itself. Equally satisfactory results may be obtained for the preventing of the formation of undue quantities of snow and ice upon the outer surface of the aeroplane or the fuselage body by the forming of relatively narrow passageways 16, disposed between the outer skin 17 and an inner skin 18 of the wing structure, or fuselage structure, and wherein the heat from the exhaust manifolds 19 and 20 of the aeroplane are released therein, thus maintaining the wing and fuselage structure of the aeroplane in a highly warmed condition. An electric generator is carried by the aeroplane and current generated may be used to warm the upper surface, of the structure by an electric heating element disposed within the wing and body structure, and more particularly in a wing structure, as illustrated in Figs. 10 and 11, wherein electric heating elements 21 may be placed within suitable passageways 22 disposed adjacent the outer skin of the wing structure for maintaining the same in a warmed and heated condition. Motor cycle riders experience great difficulty in keeping the glasses 23 and 24 of their goggles in a transparent condition in inclement weather. This may be greatly facilitated by running an electric heating element 25 circumferentially of each of the eye glasses, the electricity being carried into the goggle frame 26, through a flexible electric conductor 27, thereby maintaining the eye glasses not only in a warmed condition but in a suitable condition to prevent the forming of dew upon the interior of the same.

In Fig. 14 I have shown the look out glasses as being two in number 28 and 29, disposed in spaced relationship with each other and having an inlet passageway 30 for conducting warmed air therebetween for warming each of the glasses. An escapement hole 31 permits of a circulation of warmed air within the space disposed between the two glasses.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination in a wind shield of a transparent element disposed within a frame, a tubular element disposed adjacent the lower edge of the transparent element and made integral with windshield frame, a plurality of slits disposed in spaced relation with the upper surface of the tubular element and pneumatic means for supplying heated air to the tubular element.

2. A device of the class described comprising a frame mounting the windshield, and means for releasing warmed air adjacent the inner lower edge of the windshield, said means consisting of an enclosure disposed about the exhaust manifold of an automobile, a conductor leading from the enclosure to a distributor head disposed adjacent the windshield and made integral with the windshield frame and a plurality of outlets disposed within the distributor head.

3. A windshield warmer in combination with a stove disposed about the exhaust manifold of a motor vehicle, comprising a tubular passageway horizontally disposed adjacent to the lower inside face of the wind shield, said passageway made integral with the wind shield holding frame, a plurality of slots disposed through the passageway and in intimate relationship with the windshield, and an inlet disposed through the passageway for permitting the warmed air to enter from the stove.

GEORGE J. CREIGHTON.